United States Patent [19]
Zanier

[11] Patent Number: 5,722,179
[45] Date of Patent: Mar. 3, 1998

[54] DEVICE FOR MEASURING LENGTH

[75] Inventor: Adriano Zanier, Prilly, Switzerland

[73] Assignee: TESA SA, Renens, Switzerland

[21] Appl. No.: 568,201

[22] Filed: Dec. 6, 1995

[30] Foreign Application Priority Data

Dec. 29, 1994 [EP] European Pat. Off. ............ 94810757

[51] Int. Cl.$^6$ .................................................. G01B 5/02
[52] U.S. Cl. ............................................ 33/811; 33/810
[58] Field of Search .......................... 33/810, 811, 812, 33/832, 838

[56] References Cited

U.S. PATENT DOCUMENTS

| 1,334,984 | 3/1920 | Bourget | 33/812 |
| 1,341,865 | 6/1920 | Solberg | 33/812 |
| 2,783,542 | 3/1957 | Hastings | 33/838 |
| 3,101,550 | 8/1963 | Helferich | 33/812 |
| 3,477,675 | 11/1969 | Klink | 33/838 |
| 3,505,741 | 4/1970 | Meyer | 33/812 |
| 4,604,808 | 8/1986 | Jeannet et al. | 33/810 |

FOREIGN PATENT DOCUMENTS

| 2 481 441 | 10/1981 | France | 33/810 |
| 2 703 145 | 9/1994 | France . | |
| 42 07 142 | 9/1983 | Germany . | |
| 34 34 993 | 11/1985 | Germany . | |
| 38 34 306 | 4/1990 | Germany | 33/810 |
| 90 05 309 | 10/1990 | Germany . | |
| 91 12 923 | 10/1991 | Germany . | |
| 101 636 | 10/1923 | Switzerland . | |
| 165 061 | 1/1934 | Switzerland . | |
| 671 097 | 9/1989 | Switzerland . | |
| 618547 | 2/1949 | United Kingdom | 33/811 |

OTHER PUBLICATIONS

Patent Abstracts of Japan, vol. 7, No. 224 (p. 227) Oct. 5, 1983 & JP 58 115301 (Tajima Seisakujiyo K. K.) Jul. 9, 1983.

*Primary Examiner*—Thomas B. Will
*Attorney, Agent, or Firm*—Jacobson, Price, Holman & Stern PLLC

[57] ABSTRACT

Device for measuring length of the type sliding caliper or height gauge, in which the guiding of the slider along the beam is ensured by at least two guide shafts engaged in grooves of the slider and in slideways of the beam. The contact surface between the guide shafts is reduced to segments of a line in order to minimize the friction and to have a guide surface in a zone protected from impacts. In a preferred embodiment, the slideways have a section corresponding to a circular segment and the part of the guide shafts engaged in the slideways a section corresponding to a segment of a circle of smaller diameter. The guide shafts are supported on the slider only at their two ends and are floating between these two points of contact. The parallelism of the fixed and mobile jaws is adjustable with the aid of a screw.

28 Claims, 3 Drawing Sheets

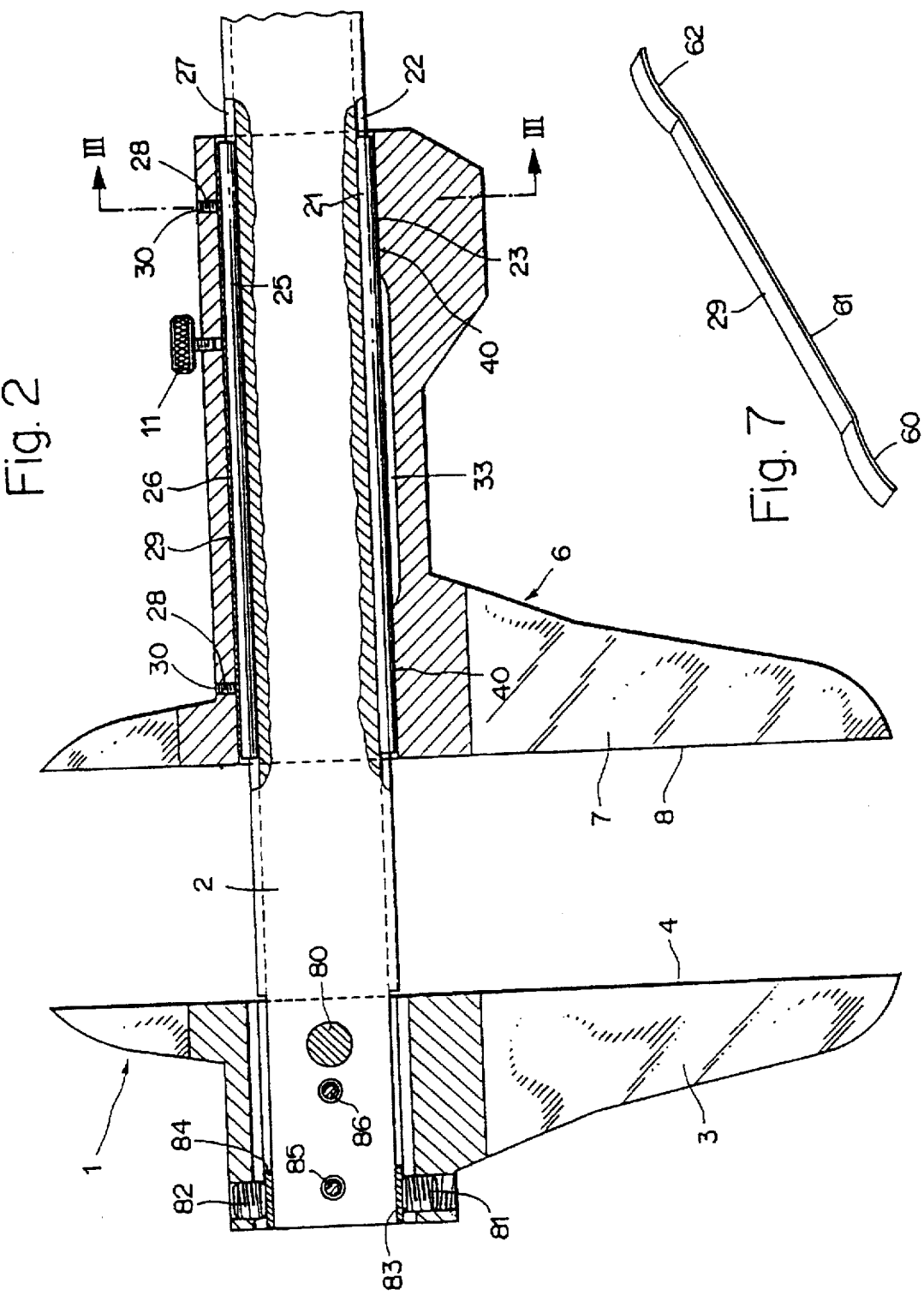

DEVICE FOR MEASURING LENGTH

This invention has as its subject matter a device for measuring length, for example of the sliding caliper type or height gauge. More specifically this invention has as its subject matter the problem of guiding of the slider for a sliding caliper or for a height gauge and the problem of adjusting the parallelism of the jaws.

It was only recently that high precision sliding calipers and height gauges could be manufactured using materials such as aluminum or plastics which are known to have the advantage of lightness and low manufacturing cost. The German utility model DE-U-91 12 923.0, filed on Oct. 17, 1991, by the Societe Anonyme des Etablissements Pierre Roch, is an example of such a sliding caliper.

In the device described in the aforementioned utility model, the slider 3, when sliding, is guided by a rib 16 forming part of the slider and engaged in a first slideway 14 belonging to the beam. A spring 8, engaged in a second slideway 13, provides a second guide surface while exercising a pushing pressure of the slider against the ruler.

However, in this design, the contact surface between the two mobile parts (slider and spring) and the fixed parts (beam) is large which produces friction, rendering the handling of the sliding caliper difficult, particularly in the case of sliding calipers of large dimension. This friction moreover cannot be adjusted, unless the spring is replaced. Furthermore the entire surface of slideways 13, 14 and even apparently the outer surface of the beam participate in guiding whereas only the bottom of the slideway is protected from impacts. If the beam is damaged, there is the risk that precise control of the slider is no longer ensured or that sliding is even prevented completely. This is especially true when the beam is made of a weak metal such as aluminum.

The rib 16 must correspond exactly to the groove 14 which imposes strict manufacturing limits and high costs. If the beam or the slider are made of a material subject to wear and tear, the longevity of the sliding caliper is not ensured. Moreover the parallelism of the jaws is obtained once and for all by machining in the course of manufacture. Defects in parallelism, for example due to imprecise construction of the guide mechanism described above, to faulty mounting of the fixed jaw 2, or to changes in dimension as a result of wear and tear or an impact, can only be corrected with great difficulty.

French patent application FR 2 481 441 (Latschbacher) (see FIG. 4 in particular) discloses an instrument for measuring length in which the slider 3 is guided on a beam 1 by mounted elements 17, 18 disposed on two opposite faces of the slider. The mounted elements 17, 18 have longitudinal grooves whose form corresponds to the profile of end walls 7, 8 of the beam. Here, too, the manufacturing of this instrument requires strict tolerances, and the wear and tear and the friction are great.

An object of the present invention is to propose a device for measuring length such as, for example, a sliding caliper or height gauge, assuring minimal friction between the ruler and the slider, and a smooth and regular movement of the slider. The friction can be adjusted simply, preferably with the aid of a screw.

Another object is to propose a device for measuring length in which the parts of the beam responsible for guiding are protected from impacts.

A further object is to propose a sliding caliper in which the parallelism of the jaws can be corrected easily, even after manufacture, by pivoting either the fixed jaw or the mobile jaw.

Still a further object of the invention is to propose a sliding caliper offering the possibility of mounting or replacing the slider or the fixed jaw individually, and then adjusting the parallelism. This modularity allows greater flexibility in the course of manufacture, and, in the course of use, allows replacing the used parts without having to replace the entire sliding caliper.

These objects are attained in the present invention with a device for measuring length comprising:

a beam provided on a first face with a first longitudinal slideway and, on a second face opposite the said first face, a second longitudinal slideway;

a slider able to slide along the said beam without direct contact, the position of the said slider with respect to the said beam permitting measurement of a length, the said slider being provided with a first longitudinal groove and a second longitudinal groove;

a first longitudinal guide shaft engaged in the said first slideway and in the said first groove;

and a second longitudinal guide shaft engaged in the said second slideway and in the said second groove.

A feature of the invention is that the contact surface between the first slideway and the first guide shaft is less than the outer surface of the part of the shaft engaged in the said first slideway.

In a preferred embodiment, the contact surface between the second slideway and the second guide shaft is less than the outer surface of the part of the shaft engaged in the said second slideway.

According to a preferred embodiment of the invention, at least one of the said contact surfaces is reduced to one or more segments of a line.

According to a preferred embodiment of the invention, at least one of the guide shafts is supported on the slider only at its two ends.

The present invention will be better understood with the aid of the appended figures and the description relating to them:

FIG. 2 shows in section the sliding caliper incorporating the present invention;

FIG. 7 shows a spring element.

The figures illustrating this invention all relate to the specific problem of the sliding caliper. It should be noted, however, that the invention applies equally well to any type of device for measuring length, depth, spacing or diameter, for example a height gauge which allows height or length to be measured.

Figure 1:
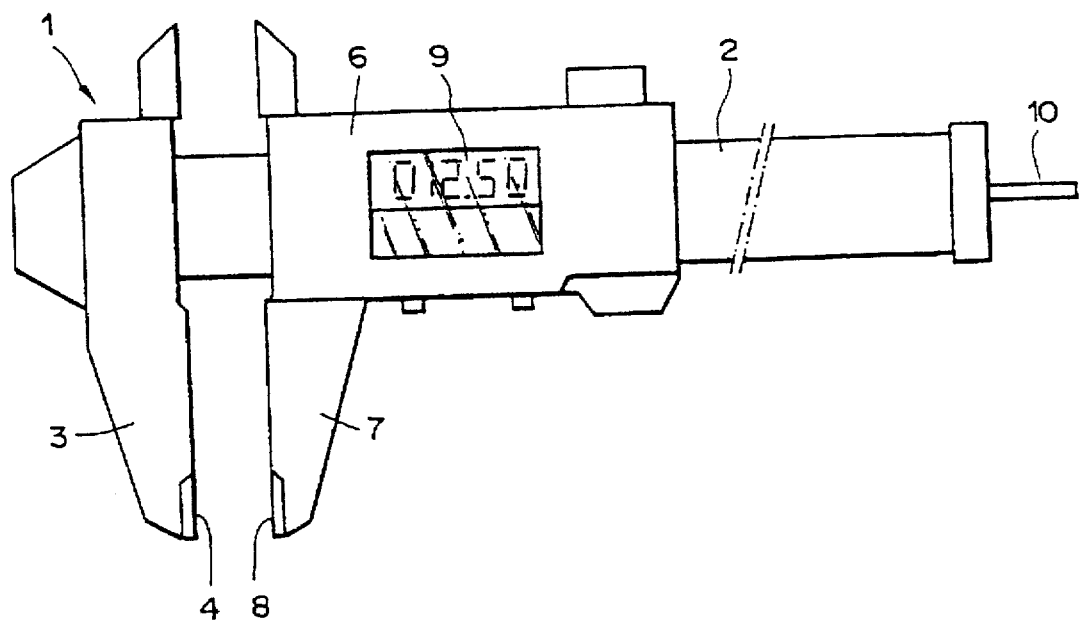
FIG. 1 shows a general view of a sliding caliper.

As in the state of the art, the sliding caliper 1 of FIG. 1 comprises a beam 2 on which a slider 6 can slide. A fixed jaw 3, having a reference face 4, is fixed to the beam in such a way that the said reference face 4 is at least approximately perpendicular to the beam. In another embodiment, the said reference face 4 can form an angle with the beam of other than 90°, for example 45°. A mobile jaw 7 is integral with the slider and also has a reference face 8 parallel to the reference face 4. A digital display device 9 indicates the distance between the two reference faces. Measurement of the length, corresponding to the distance between the jaws, can be carried out, for example, with the aid of a capacitive or electro-optical system. In a variant embodiment the display device can be of the analog type, for example a dial, or the distance can be read with the aid of a vernier scale known per se. A depth gauge 10 can be fixed to the slider to carry out measurements of depth. The beam and the slider are preferably made of aluminum, and the slider can be padded for shock-resistant protection with a synthetic material, not shown in the figures, as is known from Swiss patent CH 671 097 (Hans Meyer, Jul. 31, 1989). The invention also applies to a beam and/or a slider made of synthetic material or steel. The jaws are preferably made entirely of steel. Explained later on will be the principle of mounting of the fixed jaw on the beam, which allows correction of the parallellism of the jaws. In a variant embodiment, the jaws can be made of aluminum too; in that case, the reference faces will be made of steel in a known way and mounted on the jaws by gluing or by another means.

The guide device of the invention will now be explained with reference to FIGS. 2 and 3. For the sake of clarity of the figures, the details which are not important for understanding the invention, such as, for example, the electronics of display or of measurement, have not been shown in the figures.

The slider 6 completely surrounds the beam 2. The slider can also surround the beam only partially, for example on three sides. According to an important feature of the invention, there is no direct contact between the beam and the slider, which allows reduction of friction and alleviates the problem of jamming as a result of impacts sustained by the beam.

The guiding of the slider is carried out by means of two longitudinal guide shafts 21 and 25. The first guide shaft 25 is engaged in a first groove 26, machined for example by milling or extrusion, in the upper face of the inner part of the slider and at the same time in the first slideway 27 machined in the beam. The second guide shaft 21 is engaged in a second groove 23 machined in the lower face of the inner part of the slider and at the same time in a second slideway 22 machined in the beam. These guide shafts, which must be able to resist wear and tear, can be made of a material different from that of the beam and/or the slider, but of hardness compatible with that of the beam. For example, they can be made of anodized aluminum, of bronze, of beryllium bronze or of nickel-plated steel. They can likewise be covered with a coating of PTFE in order to decrease friction. Their hardness is preferably greater or equal to 50 HRC.

The shape of the slideways 22, respectively 27, is adapted to the shape of the guide shafts 21, respectively 25, in a way to have a minimal mutual contact surface 24, respectively 32. This contact surface is preferably less than the outer surface of the part of the guide shaft engaged in the slideway, the part outlined in FIG. 3 with a broken line. Ideally, this surface is reduced to one or more segments of a line. This feature makes it possible to ensure precise longitudinal guiding and decreased friction. Moreover, in this way, the guide zones are confined to a part well sheltered from impacts, toward the bottom of the slideways.

The part of the guide shafts engaged in the first and second slideways has preferably a cross-section in the form of a circular segment and the slideways have a cross-section corresponding to a segment of a circle of greater diameter. In this way, the contact surface between each guide shaft and the corresponding slideway is reduced to a segment of a line 24, respectively 32. Good results are thus obtained with a difference between the diameters of the slideway and the guide shaft of approximately 0.1 mm.

Figure 4:
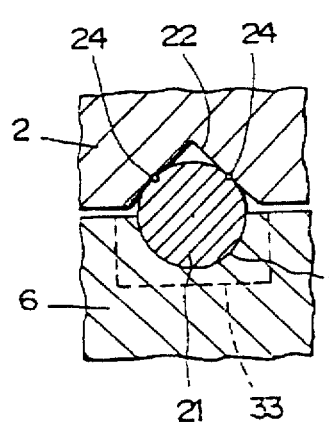
FIG. 4 shows a first variant of the shaft and of the slideway.
Figure 5:
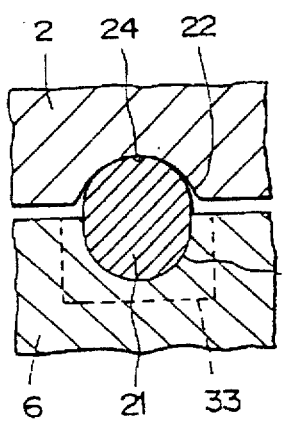
FIG. 5 shows a second variant of the shaft and of the slideway.
Figure 6:
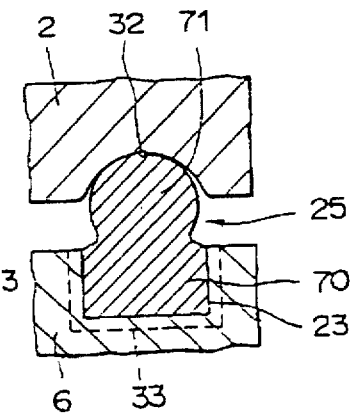
FIG. 6 shows a third variant of the shaft and of the slideway.

Other embodiments of the slideway and the guide shaft are shown in FIGS. 4 to 6, which illustrate the case of the second slideway and of the second guide shaft (reference), but which could be adapted without difficulty to the case of the first slideway and of the first guide shaft (adjustment). In FIG. 4 the slideway 22 has a triangular profile whereas the guide shaft 21 has a circular profile. In this configuration the contact surface is reduced to two segments of a line 24. This arrangement makes for an even more precise guiding of the slider. Other configurations, not shown, of the slideways and of the guide shaft have been conceived which allow the contact surface to be reduced to one or more segments of a line. Polygonal slideways, for example trapezoidal with angles between the walls and the bottom of the slideway being between approximately 30° and approximately 60°, combined with circular or substantially oval guide shafts allow, at a higher manufacturing cost, very precise guiding, a contact surface reduced to segments of a line and a reduced risk of blockage even in the case of distortions of the beam. Deeper slideways of elliptic or oval shape or having flat walls and a rounded bottom, combined with appropriate circular, elliptic or substantially oval shafts, enable moreover the contact surface at the bottom of the slideway to be relegated to a zone very well protected from impacts.

Figure 3:
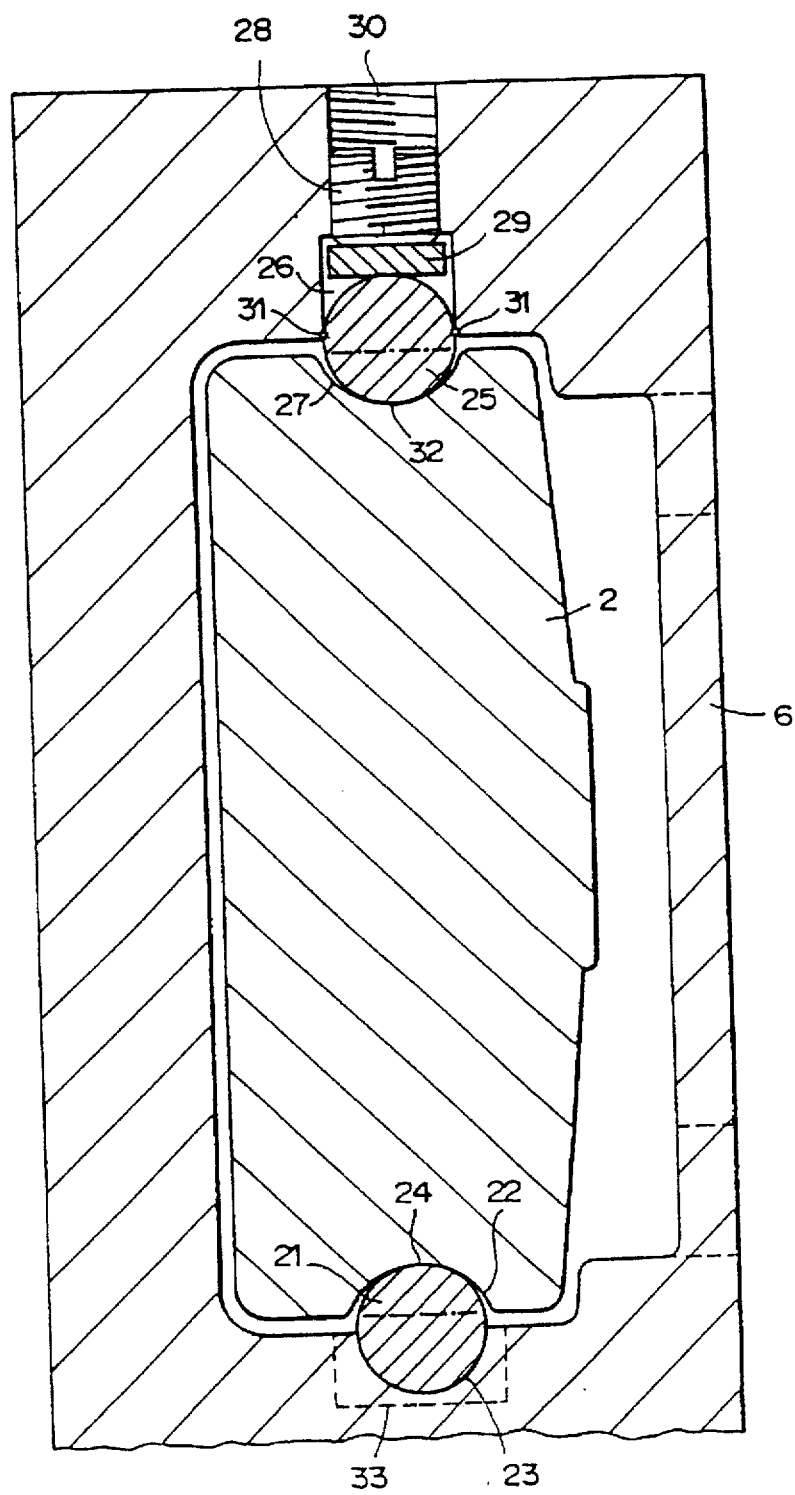
FIG. 3 is a section taken along the line III—III of the guide device of the invention used in a sliding caliper.

In FIG. 5 the slideway has the same shape as in FIG. 3 whereas the groove 23 has a shape adapted to a substantially oval guide shaft. In this way the guide shaft is maintained even better laterally in the groove and the risk of tilting is reduced. This lateral hold is improved even more in the embodiment in FIG. 6. The guide shaft in this embodiment has a contour having a section 70 of square or rectangular shape surmounted by another section 71 of rounded, preferably circular, shape. The section of square shape is machined with strict tolerances for adapting to the groove without play. The rounded section is adapted to the slideway in a way that it has a contact surface which is less than the surface of the slideway, if possible, reduced to a line of contact. This variant embodiment permits excellent lateral hold of the shaft in the groove. This shape of guide shaft is also especially well adapted to the shape of the first groove 26 and of the first slideway 27 shown in FIG. 3.

The shape of the guide shafts is preferably simple enough to be able to be obtained by wire drawing by means of a wire draw die.

According to another feature of the invention, illustrated with respect to FIG. 2, the second guide shaft 21 is supported-on the slider 6 at its two ends only. Between these two points of contact 40, a hollow space 33 is cut in the slider below the shaft. Between the two points of contact the shaft thus is supported flexibly in the hollow space, which permits absorption of any possible geometric imperfections and consequently ensures precise functioning, with little friction and without any risk of jamming.

The first guide shaft 25 is kept supported against the beam 2 at its two ends by means of two screws 28 engaged through the passageways 30 in the slider. These screws allow the pressure exerted by the shaft on the beam to be regulated and to take up the play of manufacturing tolerances. The slider exerts a pressure on the first shaft in the direction of the beam only through these screws, the first guide shaft retaining a certain flexibility between the two points of contact formed by the tips of the screws. On the other hand, the lateral faces of the first groove 26 are machined in a way to prevent any lateral displacement of the first guide shaft. In the embodiment shown in FIG. 3, there are two segments of contact 31 between the first guide shaft 25 and the slider 6. This arrangement allows the radial tilting of the jaws to be minimized. This tilting can be reduced even further if the first guide shaft has the shape of the shaft illustrated in FIG. 6.

A spring leaf 29, shown in detail in FIG. 7, exerts a pressure on the entire length of the first guide shaft 25 in the direction of the beam 2. This leaf includes a first curved part 60, a straight part 61 and a second curved part 62. The holding-in-place force of the spring leaf is on the order of some Newtons. When mounting, the curved parts of the spring are compressed to the floor, close to operational tolerance. This spring leaf permits absorption of the play in operation of the moving parts. It ensures a constant friction force and allows correction of slight defects in parallelism.

A screw 11 permits regulation of the friction of the first guide shaft on the beam. Unlike screws 28, which is preferably adjusted a single time during manufacture, or in the course of a maintenance operation, this screw permits daily regulation of the ease of movement of the slider or allows locking it completely at a given spacing.

The synthetic anti-shock padding previously mentioned, which is not shown in the figures, holds back the guide shafts and prevents them from sliding. Alternatively, stops can be integrated into the slider at the end of each guide shaft. The second guide shaft can also be made integral with the slider 6 at the level of the two points of contact 40 of the slider by any known means.

We now return to FIG. 2 to study the problem of fixing the fixed jaw 3 on the beam.

In the state of the art, the parallelism of the reference faces 4 and 8 of jaws 3 and 7 is obtained by machining of the assembled whole, for example by grinding.

This results in high costs and it is nearly impossible to correct the parallelism after manufacture, for example during a repair. Even if these drawbacks are still tolerable for sliding calipers of steel, the manufacturing cost of which is high anyway and which are sufficiently solid so that they are subjected very little to deformations, it is completely unacceptable for sliding calipers of aluminum which must be able to be manufactured at very low cost and which can require frequent repair. Moreover, if the beam has been subjected to a deformation which disturbs the sliding, the action of the necessary correction on the screws 28 of the slider can even lead to a loss of parallelism which must be able to be compensated.

The fixed jaw 3 can pivot with respect to the beam 2 about an axis 80 which is the point of rotation of the jaw. Two adjusting screws 81 and 82 permit fine adjustment of parallelism of two references faces 4 and 8. These two screws, placed in opposition, also assure the locking of the position. The adjustment can be made by closing the jaws and by adjusting the two screws until the two faces are perfectly flat, pressed one against the other. A gauge block, placed between the jaws, can also be used in the course of adjustment.

In the particular case where weak materials are used, such as aluminum, a block 83 can be placed under at least one of the screws for distributing the pressure. Likewise a spring leaf 84 can be placed under at least one of the screws for supporting the clamping state. This spring will have, for example, a curved shape when at rest and will be compressed for the clamping.

In a variant embodiment not shown, one could have just one screw for adjusting the parallelism, the other being replaced by a sufficiently strong spring. In this way the adjustment could be facilitated since it would no longer be carried out except with one screw.

The position of the fixed jaw is blocked with the aid of locking screws 85 and 86 which hold the radial position of the jaw.

With this configuration of fixed jaw, the two jaws can be machined separately without paying attention to parallelism but only to the rectitude of the reference faces 4 and 8.

Other variant embodiments within the scope of the invention have not been shown. For example, the guide device can have more than two guide shafts, for example 3 or 4 guide shafts, either distributed on the different faces or grouped together with several guide shafts on at least certain faces.

What is claimed is:

1. A device for measuring length comprising:

a beam having a first face and a second face, said beam being provided on said first face with a first longitudinal slideway and, on said second face opposite said first face, with a second longitudinal slideway, a slider able to slide along said beam without direct contact, the position of said slider with respect to said beam permitting measurement of a length, said slider being provided with a first longitudinal groove, a first longitudinal guide shaft engaged in said first slideway and in said first groove, said slider being provided with a second longitudinal groove, and a second longitudinal guide shaft, said second longitudinal guide shaft being located in said second slideway and in said second longitudinal groove, and the surface of contact between said first slideway and said first guide shaft being less than an outer surface of a part of said first shaft located in said first slideway, the contact surface between the second slideway and the second guide shaft being less than an outer surface of a part of the second shaft located in said second slideway, at least one of said contact surfaces being reduced to one or more segments of a line.

2. The device for measuring length of claim 1, wherein said first slideway has a rounded profile.

3. The device for measuring length of claim 1, wherein said second slideway has a rounded profile.

4. The device for measuring length of claim 3, wherein the part of said first guide shaft located in said first slideway and the part of said second guide shaft located in said second slideway have a cross-section corresponding to a circular segment, and wherein said first slideway and said second slideway have a cross-section corresponding to a segment of a circle of greater diameter.

5. The device for measuring length of claim 1, wherein at least one of said guide shafts is supported on said slider at its two ends only.

6. The device for measuring length of claim 5, further comprising a spring element, the first guide shaft being held supported against said beam with the aid of said spring element.

7. The device for measuring length of claim 6, wherein screws through the slider allow regulation of the force of support of said first guide shaft on said beam.

8. The device for measuring length of claim 7, wherein said first shaft is supported against said beam at its two ends by said screws and on the rest of its length by said spring element.

9. The device for measuring length of claim 1, wherein said beam is made of aluminum.

10. The device for measuring length of claim 1, wherein said slider is made of aluminum.

11. The device for measuring length of claim 1, wherein the beam is made of a synthetic material.

12. The device for measuring length of claim 1, wherein said slider is made of a synthetic material.

13. The device for measuring length of claim 1, wherein said guide shafts are made of a material selected from the group consisting of anodized aluminum, steel, bronze and beryllium bronze.

14. The device for measuring length of claim 13, wherein said shafts are covered with PTFE.

15. A sliding caliper comprising:
- a beam having a first face and a second face, said beam being provided on said first face with a first longitudinal slideway and, on said second face opposite said first face, with a second longitudinal slideway,
- a slider able to slide along said beam without direct contact, the position of said slider with respect to said beam permitting measurement of a length, said slider being provided with a first longitudinal groove,
- a first longitudinal guide shaft engaged in said first slideway and in said first groove,
- said slider being provided with a second longitudinal groove, and a second longitudinal guide shaft, said second longitudinal guide shaft being located in said second slideway and in said second longitudinal groove,
- the surface of contact between said first slideway and said first guide shaft being less than an outer surface of a part of said first shaft located in said first slideway,
- the contact surface between the second slideway and the second guide shaft being less than an outer surface of a part of the second shaft located in said second slideway,
- at least one of said contact surfaces being reduced to one or more segments of a line, and
- a fixed jaw mounted on said beam and a movable jaw forming a part of said slider, parallelism between said fixed jaw and said movable jaw being corrected with the aid of at least one screw permitting pivoting of at least one of the jaws.

16. Sliding caliper of claim 15 wherein the parallelism of said jaws can be corrected with the aid of said least one screw permitting pivoting of the fixed jaw about a shaft.

17. Sliding caliper of claim 16, wherein the parallelism of said jaws can be corrected with the aid of two screws in opposition permitting pivoting of the fixed jaw.

18. A device for measuring length comprising:
- a beam having a first face and a second face, said beam being provided on said first face with a first longitudinal slideway and, on said second face opposite said first face, with a second longitudinal slideway,
- a slider able to slide along said beam without direct contact, the position of said slider with respect to said beam permitting measurement of a length, said slider being provided with a first longitudinal groove,
- a first longitudinal guide shaft engaged in said first slideway and in said first groove,
- said slider being provided with a second longitudinal groove, and a second longitudinal guide shaft, said second longitudinal guide shaft being located in said second slideway and in said second longitudinal groove, and
- the surface of contact between said first slideway and said first guide shaft being less than an outer surface of a part of said first shaft located in said first slideway,
- the part of said first guide shaft located in said first slideway and the part of said second guide shaft located in said second slideway have a cross-section corresponding to a circular segment, and wherein said first slideway and said second slideway have a cross-section corresponding to a segment of a circle of greater diameter.

19. The device for measuring length of claim 18, wherein at least one of said guide shafts is supported on said slider at its two ends only.

20. The device for measuring length of claim 19, further comprising a spring element, the first guide shaft being held supported against said beam with aid of said spring element.

21. The device for measuring length of claim 20, wherein screws through the slider allow regulation of the force of support of said first guide shaft on said beam.

22. The device for measuring length of claim 21, wherein said first shaft is supported against said beam at its two ends by said screws and on the rest of its length by said spring element.

23. The device for measuring length of claim 18, wherein said beam is made of aluminum.

24. The device for measuring length of claim 18, wherein said slider is made of aluminum.

25. The device for measuring length of claim 18, wherein the beam is made of a synthetic material.

26. The device for measuring length of claim 18, wherein said slider is made of a synthetic material.

27. The device for measuring length of claim 18, wherein said guide shafts are made of a material selected from the group consisting of anodized aluminum, steel, bronze and beryllium bronze.

28. The device for measuring length of claim 27, wherein said shafts are covered with PTFE.

* * * * *